(12) United States Patent
Yano et al.

(10) Patent No.: US 6,795,246 B2
(45) Date of Patent: Sep. 21, 2004

(54) OPTICAL FILM, POLARIZER AND DISPLAY DEVICE

(75) Inventors: Shuuji Yano, Ibaraki (JP); Seiji Umemoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 97 days.

(21) Appl. No.: 10/195,739

(22) Filed: Jul. 16, 2002

(65) Prior Publication Data
US 2003/0016446 A1 Jan. 23, 2003

(30) Foreign Application Priority Data
Jul. 17, 2001 (JP) .................................. P2001-216146

(51) Int. Cl.$^7$ .............................................. G02B 5/30
(52) U.S. Cl. ..................... 359/500; 359/483; 359/494; 359/497; 349/118
(58) Field of Search .................... 359/483, 494, 359/497, 499, 500; 349/118, 12, 99, 113, 96, 117; 252/299.1; 428/1.3, 1.31

(56) References Cited

U.S. PATENT DOCUMENTS

| | | | |
|---|---|---|---|
| 5,245,456 A | * | 9/1993 | Yoshimi et al. ............. 349/118 |
| 6,219,122 B1 | * | 4/2001 | Uchida et al. .............. 349/117 |
| 2002/0034596 A1 | * | 3/2002 | Yano et al. ................. 428/1.31 |
| 2002/0039159 A1 | * | 4/2002 | Yano et al. ................. 349/117 |

FOREIGN PATENT DOCUMENTS

| | | |
|---|---|---|
| JP | 5-027118 | 5/1993 |
| JP | 10-239518 | 11/1998 |

* cited by examiner

Primary Examiner—Andrey Chang
Assistant Examiner—Craig Curtis
(74) Attorney, Agent, or Firm—Sughrue Mion, PLLC

(57) ABSTRACT

An optical film including: a birefringent film A having Re of from 200 to 350 nm and Nz of from 0.6 to 0.9; and a birefringent film B having Re of from 100 to 175 nm and Nz of from 0.3 to 0.7, and laminated on the birefringent film A so that optical axes of the birefringent films A and B intersect each other, in which Re and Nz are given by the relations $(nx-ny)d=Re$ and $(nx-nz)/(nx-ny)=Nz$, nx, ny and nz are refractive indices of corresponding one of the birefringent films A and B in two directions in a plane of the birefringent film and in a direction of the thickness of the birefringent film, and d is the thickness of the birefringent film. A polarizer including: an optical film defined above; and a film having a polarizing function and laminated on the birefringent film A side of the optical film. A liquid-crystal display device including: a liquid-crystal cell; and a polarizer defined above, and disposed on at least one side of the liquid-crystal cell so that the film included in the polarizer and having the polarizing function is located on the outer side. Alternatively, a display device including: a polarizer defined above, and disposed at an anterior surface of the display device so that the film included in the polarizer and having the polarizing function is located on the outer side.

7 Claims, 1 Drawing Sheet

OPTICAL FILM, POLARIZER AND DISPLAY DEVICE

Figure 1:
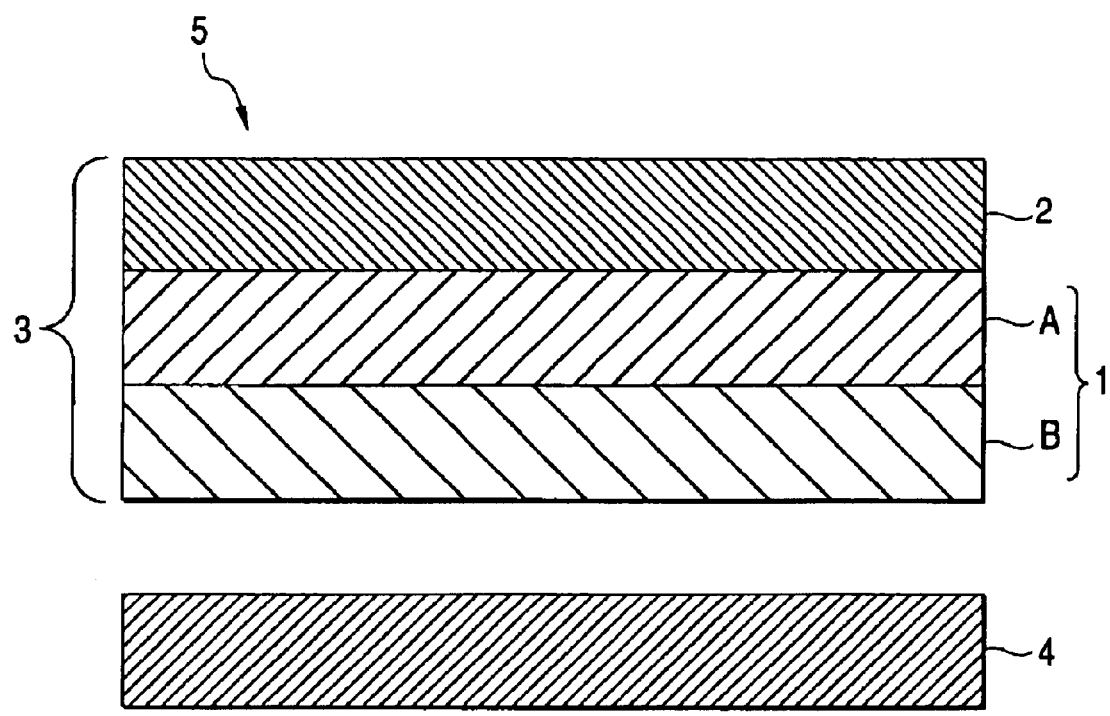

The present application is based on Japanese Patent Application No. 2001-216146, which is incorporated herein by reference.

BACKGROUND OF THE INVENTION

1. Field of the Invention

The present invention relates to an optical film in which axial displacement of a laminate hardly occurs even when a viewing point is changed, and which is adapted for forming a liquid-crystal display device good in display quality, a circularly or elliptically polarizing plate or an anti-reflection plate.

2. Description of the Related Art

If a plate, such as a phase retarder disposed between a polarizer and a liquid-crystal cell for improving display quality of a liquid-crystal display device, or a quarter-wave plate used for forming a circularly polarizing plate or an anti-reflection plate, is formed from one birefringent film, birefringence is dispersed in accordance with wavelengths on the basis of dispersion peculiar to the material of the birefringent film. As a result, variation in retardation occurs in accordance with wavelengths so that birefringence generally becomes higher as the wavelength becomes shorter. As a result, the state of polarization does not change evenly. Under such circumstances, there has been heretofore proposed an optical film having two birefringent films which are different in dispersion characteristic of birefringence in accordance with wavelengths, and which are laminated on each other so that slow axes of the two birefringent films intersect each other perpendicularly (Unexamined Japanese Patent Publication No. Hei. 5-27118 and Unexamined Japanese Patent Publication No. Hei. 10-239518).

The proposed optical film is provided so that dispersion characteristic of birefringence in accordance with wavelengths is controlled on the basis of lamination of birefringent films so that birefringence becomes lower as the wavelength becomes shorter. As a result, a uniform compensation effect can be obtained so that a uniform change in state of polarization can be achieved in a wide wavelength range. The orthogonal relation is retained on an optical axis so that an expected effect can be fulfilled. The orthogonal relation is, however, corrupted when observation is made in an oblique direction at an azimuth displaced from the optical axis due to the change of apparent axial angles, so that the expected effect cannot be fulfilled. There is therefore a problem that the state of polarization changes. Even in the case where Nz values of the birefringent films are controlled to compensate for axial displacement relative to the polarizer as described in Unexamined Japanese Patent Publication No. Hei. 5-27118, this control is not effective in compensating for axial displacement of the birefringent film laminate itself.

SUMMARY OF THE INVENTION

An object of the invention is to develop an optical film in which the crossing relation between optical axes (slow axes) is kept good even when a viewing point is changed, and which can be used for forming a liquid-crystal display device good in display quality, a quarter-wave plate or the like.

According to the invention, there is provided an optical film including: a birefringent film A having Re of from 200 to 350 nm and Nz of from 0.6 to 0.9; and a birefringent film B having Re of from 100 to 175 nm and Nz of from 0.3 to 0.7, and laminated on the birefringent film A so that optical axes of the birefringent films A and B intersect each other, in which Re and Nz are given by the relations $(nx-ny)d=Re$ and $(nx-nz)/(nx-ny)=Nz$, nz is a refractive index of corresponding one of the birefringent films A and B in a direction of a Z axis indicating a direction of the thickness of the birefringent film, nx is a refractive index of the birefringent film in a direction of an X axis indicating a direction of the highest refractive index in a plane perpendicular to the Z axis, ny is a refractive index of the birefringent film in a direction of a Y axis perpendicular both to the X axis and to the Z axis, and d is the thickness of the birefringent film.

Further, according to the invention, there is provided a polarizer including: an optical film defined above; and a film having a polarizing function and laminated on the birefringent film A side of the optical film. There is also provided a liquid-crystal display device including: a liquid-crystal cell; and a polarizer defined above, and disposed on at least one of opposite sides of the liquid-crystal cell so that the film included in the polarizer and having the polarizing function is located on the outer side. Alternatively, there is also provided a display device including: a polarizer defined above, and disposed at an anterior surface of the display device so that the film included in the polarizer and having the polarizing function is located on the outer side.

According to the invention, an optical film in which axial angles hardly change at respective azimuths on optical axes and in accordance with the change of a viewing point and in which the retardation caused by birefringence hardly changes in a wide viewing angle range can be obtained on the basis of the combination of the birefringent films A and B and the relation in arrangement between the birefringent films A and B. As a result, the optical film can be used for obtaining a circularly polarizing plate or the like having polarizing characteristic hardly changing in accordance with the viewing angle or the wavelength, or an anti-reflection plate little in viewing angle dependence. Further, the circularly or elliptically polarizing plate having polarizing characteristic hardly changing in a wide azimuth range and in a wide wavelength range can be used for forming a liquid-crystal display device exhibiting good display quality at a wide viewing angle. Further, the anti-reflection plate having circularly polarizing characteristic or the like hardly changing in a wide azimuth range and in a wide wavelength range can be used for obtaining various kinds of display devices good in display quality.

Features and advantages of the invention will be evident from the following detailed description of the preferred embodiments described in conjunction with the attached drawings.

DETAILED DESCRIPTION OF THE PREFERRED EMBODIMENTS

As shown in FIG. 1, an optical film 1 according to the invention includes: a birefringent film A (first birefringent film) having Re of from 200 to 350 nm and Nz of from 0.6 to 0.9; and a birefringent film B (second birefringent film) having Re of from 100 to 175 nm and Nz of from 0.3 to 0.7, and laminated on the birefringent film A so that optical axes of the birefringent films A and B intersect each other, in which Re and Nz are given by the relations $(nx-ny)d=Re$ and $(nx-nz)/(nx-ny)=Nz$, nz is a refractive index of corresponding one of the birefringent films A and B in a direction of a Z axis indicating a direction of the thickness of the birefringent film, nx is a refractive index of the birefringent film in a direction of an X axis indicating a direction of the highest refractive index in a plane perpendicular to the Z axis, ny is a refractive index of the birefringent film in a direction of a Y axis perpendicular both to the X axis and to the Z axis, and d is the thickness of the birefringent film.

The optical film can be formed from the birefringent films A and B which are laminated on each other so that optical axes of the birefingent films A and B intersect each other. In this case, a film having Re of from 200 to 350 nm and Nz of from 0.6 to 0.9, preferably Nz of from 0.7 to 0.8 is used as the birefringent film A. A film having Re of from 100 to 175 nm and Nz of from 0.3 to 0.7, preferably Nz of from 0.4 to 0.6 is used as the birefringent film B.

Incidentally, in the description, Re and Nz are defined by Re=(nx−ny)d and Nz=(nx−nz)/(nx−ny) in which nz is a refractive index of corresponding one of the birefringent films A and B in a direction of a Z axis indicating a direction of the thickness of the birefringent film, nx is a refractive index of the birefringent film in a direction of an X axis indicating a direction of the highest refractive index in a plane perpendicular to the Z axis, ny is a refractive index of the birefringent film in a direction of a Y axis perpendicular both to the X axis and to the Z axis, and d is the thickness of the birefringent film (this rule applies hereinafter).

Any other characteristic than Re and Nz in the combination of the birefringent films A and B is not particularly limited. Hence, the birefringent films A and B may be formed from one material or maybe formed from different materials respectively. When the birefringent films A and B are formed from one material, the birefringent films A and B can be used as a combination of a film functioning as a half-wave plate (A) with respect to light with a certain wavelength and a film functioning as a quarter-wave plate (B) with respect to light with the same wavelength because the birefringent films A and B are equal to each other in dispersion characteristic of refractive index or birefringence in accordance with wavelengths. In this case, the optical film can be preferably used for forming a circularly polarizing plate or the like. When the birefringent films A and B are formed from difference materials respectively, the birefringent films A and B can be used as a combination of films different in dispersion characteristic of refractive index or birefringence in accordance with wavelengths.

Each of the birefringent films A and B may be a monolayered film or may be a laminate of at least two retardation films to adjust the characteristic of the birefringent film. When each of the birefringent films A and B is provided as a laminate of retardation films, the retardation films may be formed from one kind of material or may be formed from different kinds of materials respectively. Further, the birefringent films A and B may be laminated in such a manner that at least two retardation films forming one birefringent film (for example, A) and the other birefringent film (for example, B) or at least two retardation films forming the other birefringent film (for example, B) are disposed alternately. That is, at least two retardation films forming one birefringent film need not be laminated adjacently.

The film forming the birefringent film is not particularly limited. A suitable film such as a film of a polymer such as polycarbonate, polypropylene, polyester, polyvinyl alcohol, polymethyl methacrylate, polyether-sulfone, polyallylate or polyimide, or a film obtained by coating an isotropic or anisotropic base material with a refractive-index anisotropic material such as an inorganic material or a liquid-crystal material may be used. Particularly, a film excellent in transparency (light transmittance) is preferably used. The birefringent film constituted by a polymer film can be obtained as a suitably oriented film such as a uniaxially or biaxially stretched film.

The crossing angle between optical axes (fast axes or slow axes) of the birefringent films A and B is not particularly limited. The crossing angle can be determined desirably to be 90 degrees or 45 degrees or other degrees. Incidentally, when the crossing angle between optical axes of the birefringent films A and B is set at a predetermined value, for example, 90 degrees, axial displacement due to operating error is allowable. When the direction of an optical axis of each birefringent film varies, the slow axis or the like is determined on the basis of the average direction thereof.

Incidentally, for example, the control of Nz can be performed by a method of changing the refractive index of the film in a direction of the thickness of the film. An example of the method is a method of curing a polymer such as polycarbonate exhibiting positive birefringence because of the appearance of a slow axis in a direction of orientation of molecules while adjusting the oriented state by application of an electric field in a direction of the thickness of the film to thereby stretch the film. On the other hand, for example, the control of Re can be performed by a method of changing the material for forming the film, the condition for stretching the film, and the thickness of the film.

The birefringent films A and B in the optical film may be simply put on top of each other or may be preferably laminated on each other in a bonded and fixed state from the point of view of preventing displacement of optical axes. The laminating method is not particularly limited. For example, a suitable method such as a bonding method using an adhesive agent or a tackifier excellent in transparency can be used. The adhesive agent or the like is not particularly limited in kind. An adhesive agent not requiring any high-temperature process for curing and drying is preferable, and an adhesive agent not requiring any long-term curing and drying process is desirable, from the point of view of preventing the optical characteristic of the birefringent films from changing.

As described above, each of the birefringent films can be formed as a coating film of a refractive-index anisotropic material. In this case, one birefringent film (for example, A or B) capable of serving also as a support base material may be coated with a layer of the other birefringent film (for example, B or A) formed as the coating film to thereby form an optical film from the birefringent films A and B.

In this case, when lyotropic liquid crystal is used as the refractive-index anisotropic material for forming the coating film, the direction of orientation of the liquid crystal can be controlled in accordance with the direction of application of the liquid crystal on the basis of the shear orientation characteristic of the material. As a result, an optical film having a predetermined crossing angle between optical axes can be formed by a simple operation, so that production efficiency of the optical films is excellent. On the other hand, when the birefringent films are bonded and laminated on each other by a coating method, the provision of a separate adhesive agent can be omitted advantageously to reduction in thickness. Incidentally, a suitable material exhibiting shear orientation characteristic as described above can be used as the lyotropic liquid crystal.

The optical film can be used for various purposes such as formation of a polarizer such as a circularly or elliptically polarizing plate or an anti-reflection plate, rotation of the azimuth (vibration plane) of linearly polarized light, and improvement in viewing angle of liquid-crystal display or in display quality, in the same manner as in the related-art phase retarder or wave plate in accordance with the retardation characteristic of the optical film. In this case, the optical film 1 maybe laminated on a film 2 having a polarizing function so that the laminate can be put into practical use as a polarizer 3 as shown in FIG. 1. The polarizer 3 can be provided so that the change of polarizing characteristic due to the viewing angle or the wavelength can be reduced. Hence, the polarizer 3 can be preferably used for forming a liquid-crystal display device exhibiting good display quality at a wide viewing angle or in all azimuths or as an anti-reflection plate little in the change of characteristic in accordance with wavelengths.

For forming the polarizer 3, the film 2 having the polarizing function may be laminated on the birefringent film B side of the optical film 1. From the point of view of reducing the change of the polarizing characteristic in accordance with the viewing angle or the wavelength, the film 2 having the polarizing function is, however, preferably laminated on the birefringent film A side of the optical film 1. In this case, when an absorptive type film is used as the film 2 having the polarizing function and laminated so that the absorption axis of the film 2 becomes parallel with the slow axis of the birefringent film A, a circularly or elliptically polarizing plate particularly little in the change of polarizing characteristic in accordance with the viewing angle can be obtained.

Further, when the polarizer is used for a specific purpose of forming a circularly polarizing plate or the like as described above, it is preferable from the point of view of preventing the change of polarizing characteristic that the birefringent films A and B forming the optical film are combined so that the crossing angle between optical axes of the birefringent films A and B is in a range of from 40 to 50 degrees, particularly equal to 45 degrees while the birefringent films A and B function as a half-wave plate (A) and a quarter-wave plate (B) with respect to light with the same wavelength.

A suitable film can be used as the film having the polarizing function without any particular limitation. Generally, an absorptive type polarizing film absorbing one linearly polarized light component while transmitting the other linearly polarized light component perpendicular in vibration plane to the first-mentioned linearly polarized light component maybe used as the film having the polarizing function. Examples of the absorptive type polarizing film include: a film obtained by stretching a film of a hydrophilic polymer such as polyvinyl alcohol after adsorbing iodine or a dichroic substance such as dichroic dye onto the hydrophilic polymer film; and a polyene-oriented film obtained by treating a film of a polymer such as polyvinyl chloride. The absorptive type polarizing film may contain a transparent protective film such as a triacetyl cellulose film disposed on one or each of opposite surfaces of the absorptive type polarizing film.

A suitable method can be used for laminating the optical film and the film having the polarizing function onto each other without any particular limitation. Any one of various methods using an adhesive agent can be used in the same manner as in the lamination of the birefringent films A and B. Incidentally, the optical film may serve also as the transparent protective layer in the absorptive type polarizing film. A suitable layer such as a resin coating layer, an anti-reflection layer or an anti-glare layer may be provided on one or each of opposite surfaces of the polarizer for the purpose of protection such as water resistance in accordance with necessity. The parallel relation between the retarder phase axis of the birefringent film and the absorption axis of the polarizer is preferably set so that the axes are made as parallel with each other as possible though axial displacement due to operating error is allowable. When the direction of the slow axis or the absorption axis varies, the slow axis or the absorption axis can be determined on the basis of the average direction thereof.

The polarizer can be used for various purposes such as formation of a liquid-crystal display device in accordance with polarizing characteristic such as circularly polarizing characteristic on the basis of the retardation characteristic of the optical film. Incidentally, in a reflective display device using TN liquid crystal, circularly polarized light may be made incident on a liquid-crystal cell in order to improve display quality. In this case, when the polarizer according to the invention is disposed as a circularly polarizing plate, good display quality in which black display is little colored can be achieved. The polarizer according to the invention can be also used for improving display quality such as enlargement of the viewing angle by compensating for the retardation caused by the liquid-crystal cell.

The formation of the liquid-crystal display device can be performed by disposing the optical film or the polarizer on one or each of opposite sides of the liquid-crystal cell. In this case, as illustrated in FIG. 1, the optical film 1 is preferably disposed between the film 2 having the polarizing function and a liquid-crystal cell 4 or to be located internally in order to obtain a liquid-crystal display device 5 good in display quality and wide in viewing angle.

The liquid-crystal cell used is optional. A suitable liquid-crystal cell such as a TN liquid-crystal cell, an STN liquid-crystal cell or a VA liquid-crystal cell can be used. Any one of various types of liquid-crystal display devices such as a transmissive liquid-crystal display device, a reflective liquid-crystal display device and an external light-illumination double type liquid-crystal display device can be formed as the liquid-crystal display device. When a liquid-crystal display device is to be formed, the optical film or the polarizing film according to the invention can be also used as an optical film or a polarizer to be laminated on a suitable optical component such as a phase retarder or a light-diffusing plate used for forming the liquid-crystal display device.

The polarizer provided as a circularly polarizing plate can be used as an anti-reflection plate. In this case, the polarizer exhibits anti-reflection characteristic in a wide wavelength range, so that good characteristic in which reflected light is little colored can be obtained. Moreover, lowering of anti-reflection efficiency in an oblique direction can be suppressed, unlike the related-like circularly polarizing plate. Such anti-reflection characteristic can be fulfilled when the polarizer is disposed in an anterior surface so that the film having the polarizing function and included in the polarizer is located on the outer side. As a result, any one of various kinds of display devices can be formed. The display device is not particularly limited. For example, the display device can be provided as any one of various kinds of devices in accordance with a related-art display device provided with an anti-reflection film.

EXAMPLE 1

A birefringent film A1 constituted by a stretched film of polycarbonate and having Re of 270 nm and Nz of 0.75, and a birefringent film B1 constituted by a stretched film of polycarbonate and having Re of 135 nm and Nz of 0.5 were bonded and laminated on each other through an adhesive agent so that slow axes of the birefringent films A1 and B1 made 45 degrees. Thus, an optical film was obtained.

On the other hand, a transparent protective layer formed from a triacetyl cellulose-based film was provided on one side of a polyvinyl alcohol-based uniaxially stretched film containing iodine adsorbed thereto. Thus, an absorptive type polarizing film was prepared. The other surface of the absorptive type polarizing film opposite to the transparent protective layer was bonded and laminated, through an adhesive agent, on the birefringent film A1 side of the optical film so that an absorption axis of the absorptive type polarizing film was parallel with the slow axis of the birefringent film A1. Thus, a circularly polarizing plate was obtained.

Comparative Example

A birefringent film X constituted by a stretched film of polycarbonate and having Re of 270 nm and Nz of 1.0, and a birefringent film constituted by a stretched film of polycarbonate and having Re of 135 nm and Nz of 1.0 were bonded and laminated onto each other through an adhesive agent so that slow axes of the birefringent films made 60 degrees. Thus, an optical film was obtained. An absorptive type polarizing film was bonded and laminated onto the birefringent film X side of the optical film in the same manner as in Example 1. Thus, a circularly polarizing plate was obtained. The crossing angle between the absorption axis of the absorptive type polarizing film and the slow axis of the birefringent film X was, however, set at 15 degrees.

Evaluation Test

The state of polarization of light with a wavelength of 540 nm transmitted through the absorptive type polarizing film in the circularly polarizing plate obtained in each of Example 1 and Comparative Example was measured so that Stokes parameters standardized on the assumption that the S0 component was 1 was calculated on the basis of the measured value of the polarization state. As a result, the absolute value of the S3 component in Example 1 was not smaller than 0.99 both in a normal direction and in an obliquely viewing direction (at an azimuth of 45 degrees from the absorption axis of the absorptive type polarizing film and in a direction of 60 degrees from the normal direction).

In Comparative Example, the absolute value of the S3 component was, however, 0.94 in the obliquely viewing direction, indicating that the transmitted light contained much elliptically polarized light component although the absolute value of the S3 component was not smaller than 0.99 in the normal direction. Moreover, when the absorption axis of the absorptive type polarizing film and the slow axis of the birefringent film X were set to be parallel with each other in Comparative Example, the performance of the circularly polarizing plate obtained became worse.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical film comprising:

a first birefringent film having Re of from 200 to 350 nm and Nz of from 0.6 to 0.9; and a second birefringent film having Re of from 100 to 175 nm and Nz of from 0.3 to 0.7, and laminated on said first birefringent film so that optical axes of said first and second birefringent film intersect each other, in which Re and Nz are given by relations $(nx-ny)d=Re$ and $(nx-nz)/(nx-ny)=Nz$, nz is a refractive index of corresponding one of said first and second birefringent films in a direction of a Z axis indicating a direction of a thickness of the birefringent film, nx is a refractive index of the birefringent film in a direction of an X axis indicating a direction of a highest refractive index in a plane perpendicular to the Z axis, ny is a refractive index of the birefringent film in a direction of a Y axis perpendicular both to the X axis and to the Z axis, and d is the thickness of the birefringent film.

2. An optical film according to claim 1, wherein said first and second birefringent films are constituted by a combination of a birefringent film functioning as a half-wave plate with respect to light with a certain wavelength and a birefringent film functioning as a quarter-wave plate with respect to light with the same wavelength.

3. A polarizer comprising:

an optical film defined in claim 1; and a film having a polarizing function and laminated on a first birefringent film side of said optical film.

4. A polarizer according to claim 3, wherein said film having said polarizing function is constituted by an absorptive type polarizing film having an absorption axis which is arranged so as to be parallel with a slow axis of said first birefringent film.

5. A polarizer according to claim 3, wherein a crossing angle between optical axes of said first and second birefringent films forming said optical film is in a range of from 40 to 50 degrees, so that said polarizer functions as one of a circularly polarizing plate and an elliptically polarizing plate.

6. A liquid-crystal display device comprising:

a liquid-crystal cell; and a polarizer defined in claim 3, and disposed on at least one of opposite sides of said liquid-crystal cell so that said film included in said polarizer and having said polarizing function is located on an outer side.

7. A display device comprising:

a polarizer defined in claim 3, and disposed at an anterior surface of said display device so that said film included in said polarizer and having said polarizing function is located on an outer side.

* * * * *

UNITED STATES PATENT AND TRADEMARK OFFICE
CERTIFICATE OF CORRECTION

PATENT NO. : 6,795,246 B2
DATED : September 21, 2004
INVENTOR(S) : Shuuji Yano and Seiji Umemoto It is certified that error appears in the above-identified patent and that said Letters Patent is hereby corrected as shown below:

Column 8,
Line 14, delete "$(nx=nz)/(nx-ny)=Nz$" and insert -- $(nx-nz)/(nx-ny)=Nz$ --.

Signed and Sealed this

Twenty-second Day of February, 2005

JON W. DUDAS
*Director of the United States Patent and Trademark Office*